(12) United States Patent
Boldrin

(10) Patent No.: US 10,015,933 B2
(45) Date of Patent: Jul. 10, 2018

(54) LAMINAR BODY FOR MAKING GREENHOUSE ROOFS AND METHODS OF GREENHOUSE CULTIVATION

(71) Applicant: Cytec Industries Inc., Princeton, NJ (US)

(72) Inventor: Lanfranco Boldrin, Castano Primo (IT)

(73) Assignee: CYTEC INDUSTRIES INC., Princeton, NJ (US)

( * ) Notice: Subject to any disclaimer, the term of this patent is extended or adjusted under 35 U.S.C. 154(b) by 586 days.

(21) Appl. No.: 14/233,702

(22) PCT Filed: Oct. 30, 2012

(86) PCT No.: PCT/IB2012/056005
§ 371 (c)(1),
(2) Date: Jan. 17, 2014

(87) PCT Pub. No.: WO2013/064970
PCT Pub. Date: May 10, 2013

(65) Prior Publication Data
US 2014/0157663 A1 Jun. 12, 2014

(30) Foreign Application Priority Data
Oct. 31, 2011 (IT) .............................. PD2011A0341

(51) Int. Cl.
| | | |
|---|---|---|
| *C08K 3/18* | (2006.01) | |
| *C08K 3/22* | (2006.01) | |
| *A01G 9/14* | (2006.01) | |
| *B32B 27/20* | (2006.01) | |
| *B32B 27/30* | (2006.01) | |
| *C08J 3/22* | (2006.01) | |
| *C08K 3/34* | (2006.01) | |
| *C08K 5/10* | (2006.01) | |
| *C08K 5/1535* | (2006.01) | |
| *C08L 23/12* | (2006.01) | |
| *C08L 31/04* | (2006.01) | |

(52) U.S. Cl.
CPC ............. *A01G 9/14* (2013.01); *A01G 9/1438* (2013.01); *B32B 27/20* (2013.01); *B32B 27/306* (2013.01); *C08J 3/226* (2013.01); *C08K 3/22* (2013.01); *C08K 3/34* (2013.01); *C08K 5/10* (2013.01); *C08K 5/1535* (2013.01); *B32B 2264/102* (2013.01); *C08K 2003/2241* (2013.01); *C08K 2201/011* (2013.01); *C08L 23/12* (2013.01); *C08L 31/04* (2013.01); *Y02A 40/252* (2018.01); *Y10T 428/256* (2015.01)

(58) Field of Classification Search
CPC ................ C08K 3/0033; C08K 3/0041; C08K 2003/0881; C08K 3/18; C08K 3/22; C08K 2003/2241
See application file for complete search history.

(56) References Cited

U.S. PATENT DOCUMENTS

| | | | |
|---|---|---|---|
| 5,504,134 A | 4/1996 | Palmer et al. | |
| 6,407,156 B1 | 6/2002 | Hagihara et al. | |
| 2009/0203164 A1* | 8/2009 | Kang | ................... H01G 9/2004 438/82 |
| 2016/0071627 A1* | 3/2016 | Marks | ................... B82Y 30/00 524/176 |

FOREIGN PATENT DOCUMENTS

| | | | |
|---|---|---|---|
| CA | 2793773 | * | 9/2011 |
| CN | 1211202 C | | 7/2005 |
| CN | 1927930 | * | 3/2007 |
| CN | 1927930 A | | 3/2007 |
| CN | 101331842 A | | 12/2008 |
| EP | 0 746 973 A1 | | 12/1996 |
| FR | 2 773 100 A1 | | 7/1999 |
| JP | 04-271729 | | 9/1992 |
| JP | 11-010803 | | 1/1999 |
| JP | 2005-255558 A | | 9/2005 |
| JP | 2007-295858 | | 11/2007 |
| JP | 2009-225668 | | 10/2009 |
| JP | 2010-220567 | | 10/2010 |
| WO | WO 02/062578 A1 | | 8/2002 |
| WO | WO 2011/113692 A1 | | 9/2011 |

OTHER PUBLICATIONS

Q. Zhang et al., "Antibacteria and Detoxification Function of Polystyrene/$TiO_2$ Nanocomposites." Journal of Dispersion Science and Technology, vol. 28, No. 6, pp. 937-941, 2007.

* cited by examiner

*Primary Examiner* — Charles Boyer
(74) *Attorney, Agent, or Firm* — Blank Rome LLP; Charles E. Bell

(57) ABSTRACT

The invention relates to a laminar body for making greenhouse roofs, comprising at least one laminar layer, which defines at least one main surface of the laminar body and comprises a polymer matrix and nano-particles of titanium dioxide $TiO2$ in the anatase and/or rutilium form, dispersed in the polymer matrix. The nano-particles have dimensions not greater than 100 nm. The titanium dioxide is present with a concentration in weight of between '30 and 1500 ppm in relation to the polymer matrix. The invention also relates to a method of greenhouse cultivation and the use of the laminar body according to the invention for making greenhouse roofs. The invention also relates to a greenhouse having a roof comprising at least one laminar body according to the invention and to a masterbatch for making a laminar layer of a laminar body according to the invention.

40 Claims, No Drawings

LAMINAR BODY FOR MAKING GREENHOUSE ROOFS AND METHODS OF GREENHOUSE CULTIVATION

FIELD OF APPLICATION

The present invention relates to a laminar body for making greenhouse roofs and method of greenhouse cultivation.

STATE OF THE ART

As is known, in greenhouse cultivation it is fundamental to reduce the daytime temperature inside the greenhouses, depending on the luminous transmittance of the roof (film or sheet) and the current state of the cultivation.

Up to today, the lowering of temperatures exceeding the limits of physiological tolerance has been achieved by inserting dispersion or filtering agents in the roofs.

In all cases, the additives used de facto reduce the solar radiation available to the plants and therefore their photosynthesis with an evident negative effect on the plants themselves. At moments of greatest insolation and irradiation in fact the opposite effect should be encouraged (i.e. an increase in photosynthesis) so as to have increased productivity and healthiness of the cultivation.

Within this framework multilayer films have been proposed for making greenhouse roofs, designed with a multilayer structure and a chemical composition of the individual layers such as to increase the "photoluminescence" of the film with the transformation of radiant bands from the UV field to the visible field. The beneficial effects on the plants are however limited.

The use of additives must, in addition, be assessed bearing in mind the effects on the mechanical and chemical resistance of the laminar body to be used for the roof.

This is even more important in the case of roofs made with flexible films, as against roofs made with rigid or semi-rigid sheets. Flexible films are cheaper than rigid sheets, require less sturdy support structures and are easier to apply but, at the same time, are generally less mechanically and chemically resistant.

The choice of roof material and additives is therefore very important since different, sometimes contrasting, requirements need to be catered to. For example, mechanical resistance can be increased by increasing the thickness, but this reduces the luminous transmission of the laminar body. Moreover, for the same thickness, the thermic effect (understood as the ability to maintain the temperature in the greenhouses at night) for example of a material such as plasticised PVC (widely used to make rigid sheets) is over twice that of another material such as polyethylene (used to make flexible films).

In such regard examples may be cited of films made from LDPE, EVA/C, PP with the addition of additives, generally silicates or carbonates, which prevent or limit the direct transmission of solar radiation (UVA, Visible or short IR) on the plants preventing scorching resulting from the refraction or diffraction of solar rays.

These films, known as "Diffused Light" contain mineral charges or other solutions which have an effect of reflecting all the luminous radiation, including UVA rays, partially inside the green house and partially outside. The various rebounds of the luminous rays determine a reduction of incoming energy, but, at the same time, a lowering of the radiant level for the plants, despite guaranteeing a positive and certain luminous uniformity. The final effect is that of a total lowering of radiation which, often, may be insufficient for physiological requirements.

The additives used further weaken the structure of the film and, for the same thickness, reduce its mechanical resistance.

A film based on a polymer material containing dispersed bubbles of gas is also mentioned. This film has an average lower mechanical resistance than its counterparts produced with same base polymer. In addition, the high absorption of solar radiation in the short infrared field (due to the presence of the bubbles which cause a particular physical and chemical structure), reduces the input of direct light inside the greenhouse, determining situations of low radiation sometimes incompatible with the requirements of many crops. The same observation also applies as regards the almost total absorbance in the UV field.

As is known, another problem typical of greenhouse cultivation is the formation of condensation on the inner surface of the roofs. This phenomenon is extremely damaging to the crops, given that it provides an ideal environment for the proliferation of parasites, as well as direct and irreparable damage resulting from the dripping of drops of condensation onto the leaves or fruits.

Generally, the electrostatic charge present on the surface of normal films used for making roofs is unable to resolve this serious problem of condensation. Currently, the phenomenon is therefore attenuated by adding surfactants to the film so as to reduce the surface tension, which have however a limited efficacy and relatively short duration.

PRESENTATION OF THE INVENTION

Consequently, the purpose of the present invention is to eliminate the drawbacks of the prior art mentioned above by making available a laminar body for making greenhouse roofs which makes it possible to increase the photosynthesis activity of the crops without reducing the screening effect.

A further purpose of the present invention is to make available a laminar body for making greenhouse roofs which permits a reduction of the formation of condensation inside the greenhouse without the use of surfactants.

A further purpose of the present invention is to make available a laminar body to make greenhouse roofs which is mechanically and chemically resistant.

A further purpose of the present invention is to make available a laminar body to make greenhouse roofs which is easy and economical to produce.

A further purpose of the present invention is to make available a greenhouse cultivation method which makes it possible to increase the photosynthesis activity of the plants without reducing its protective effect.

The technical characteristics of the invention according to the aforesaid purposes can be clearly seen from the contents of the claims below and the advantages of the same will be more clearly evident from the detailed description which follows.

DETAILED DESCRIPTION

According to a general embodiment of the invention the laminar body for making greenhouse roofs comprises at least one laminar layer, which defines at least one main surface of the laminar body and comprises a polymer matrix and nano-particles of titanium dioxide $TiO_2$ in the anatase and/or rutilium form, dispersed in the polymer matrix.

As will be explained further and more clearly below, for the purposes of the invention, in a condition of use the laminar body is oriented with the main surface, defined by the aforesaid at least one laminar layer with nano-particles, facing directly inside the greenhouse.

The nano-particles of titanium dioxide TiO2 have dimensions not greater than 100 nm (nanometers).

The titanium dioxide is present in a concentration in weight of between 30 and 1500 ppm in relation to the polymer matrix (i.e. between 0.003% and 0.15% in weight). It has in fact been observed that concentrations of titanium dioxide in the form of nano-particles over 1500 ppm in weight (in particular if over 1% in weight) become essentially harmful because of their violent oxidising effect of the molecular bonds, destroying the film in a very short time and lowering the luminous transmittance of the film to unacceptable values for cultivation. Other negative effects will be pointed out further on in the description Preferably, the titanium dioxide is present in a concentration in weight of between 300 and 1500 ppm (i.e. between 0.03% and 0.15% in weight) in relation to the polymer matrix.

Preferably, the nano-particles of titanium dioxide TiO2 have dimensions not greater than 20 nm, and even more preferably not more than 10 nm.

Advantageously the nano-particles of titanium dioxide are evenly dispersed in the polymer matrix.

Preferably, the titanium dioxide TiO2 has a purity of not less than 99.5%. Preferably, the titanium dioxide is free of contaminant elements which could have negative effects on the polymer matrix.

According to a preferred embodiment solution, the titanium dioxide TiO2 is in the anatase form.

It is possible to envisage the use of a mixture of titanium dioxide in the anatase form and in the rutilium form.

Preferably, the polymer matrix is made from polyolefins and thermoplastic copolymers of polyolefins.

In particular, the polymer matrix of the aforesaid layer with nano-particles comprises one or more polymers, taken singly or mixed with each other, chosen from the group consisting of polyethylene (PE), linear low density polyethylene (LLDPE), polypropylene (PP), copolymer propylene, ethylene vinyl acetate (EVA), ethylene butyl acrylate (EBA), ethylene methyl acrylate (EMA), poly methyl methaacrylate (PMMA), polycarbonate (PC), polyamide (PA), ethylene tetra fluoroethylene (ETFE) and polyvinylidene fluoride (PVDF). The use of other polymers is not excluded.

Preferably, the aforesaid at least one laminar layer is obtained by extrusion or co-extrusion. In the same way, even in the case in which the laminar layer comprises two or more of such laminar layers (as will be described further on in the description), such layers are obtained singly by extrusion (and then joined to each other), or are obtained already joined together by co-extrusion.

Advantageously, the polymer matrix comprises within it photo-stabilising additives.

Preferably, photo-stabilizers are used which do not have screening properties against UV rays. In particular, such stabilisers are stereo-hindered amine stabilizers, either HALS (Hindered Amine Light Stabilisers) (HALS) or NOR_HALS (Monomeric N-alkoxy Hindered Amine Light Stabilisers).

In place of or combined with the non-screening photo-stabilisers, photo-stabilizers with a UV screening effect (such as nickel quencher) may be used.

Preferably, the aforesaid photo-stabilising additives are present in the single laminar layer with a concentration in weight of 0.60% to 1.25%.

Advantageously, the polymer matrix of the single laminar layer comprises within it additives having a UV screening function. Preferably, such additives with a UV screening function (UV adsorber) are present with a concentration in weight of 0.15% to 0.35%. In particular, such additives with a UV screening effect are chosen from the group composed of triazine (2,4-Bis(2,4-dimethyl phenyl)-6-(2-hydroxy-4-n-octiloxyphenyl)-1,3,5-triazine), benzophenone (2-hydroxy-4-n-octoxybenzophenone), triazole (3,5-Di-(t-Butyl)-4-hydroxy benzoic acid, hexadecyl ester) and benzotriazole (2-(2'-hydroxy-3'-t-butyl-5'-methyl phenyl)-5-chlorobenzotriazole).

The presence of photo-stabilizers and/or of additives with a UV screening function makes it possible to calibrate the reactivity of the TiO2 within the laminar layer. To such purpose in particular, additives are used having a transparency to UV rays with at least 25% of UV transmittance from 315 to 400 nm so to permit the right catalyst effect and contemporaneously adequate protection of the molecular bonds for an adequate duration of use of the laminar body.

Advantageously, the polymer matrix of the single laminar layer may comprise within it surfactants additives. In particular the surfactants additives are chosen from the group composed of ethyl-ester octadecane and sorbitan monostearate, taken singly or mixed with each other. Preferably, the aforesaid surfactant additives are present in the single laminar layer with a concentration in weight of 1% to 1.5%.

As will be described further on in the description, in the case in which the laminar body comprises two superficial laminar layers (of which one facing the inside of the greenhouse and the other facing the outside of the greenhouse), the surfactants are preferably present only in the laminar layer facing inwards. The use of the surfactants aims to constantly maintain a very fine film of humidity on the surface of the laminar body (facing the inside of the greenhouse) which film of humidity—as will be specified later on in the description—permits the photo-catalytic reaction which is propagated inside the greenhouse determining an environmental sanitisation effect.

On account of the hyper hydrophilic properties of titanium dioxide in the anatase form, the use of nano-particles of TiO2 anatase with concentrations in weight on a single laminar layer of over 1500 ppm would lead to the surface of the laminar body being practically dry. The absence of humidity on the surface of the laminar body would prevent the occurrence of the redox reactions activated by said TiO2 and thereby the fungicide, antiviral and antibacterial effect related to such reactions (as will be described further on in the description). The presence of surfactants inside the polymer matrix of the superficial laminar layer facing the inside of the greenhouse aims to attenuate the hyper hydrophilic properties of the titanium dioxide, so as to guarantee—as already said—the presence of a film of humidity.

Advantageously, the polymer matrix of the single laminar layer may comprise within it micronized quartzite (also known as silica crystal powder or silica dioxide powder). In particular the micronized quartzite has a mean particle dimension of 10 to 20 μm (micrometers). Preferably, the micronized quartzite is present in the single laminar layer with a concentration in weight of 0.3% to 0.5%.

It has been observed that the micronized quartzite present inside the polymer matrix acts in synergy with the nano-particles of anatase titanium dioxide. The quartzite crystals reflect part of the UV onto the surface of the nano molecules of titanium dioxide. This increases, in a significant but calibrated manner, photo catalysis. The specific formation of such micro crystals does not influence the transmittance of the laminar layer. On the contrary there is evidence of a probable shift of luminous radiation (within the visible spectrum) caused by such crystals with slight increases in the total luminosity of the greenhouse environment. In any case, the presence of micronized quartzite and nano-particle titanium dioxide causes a greater distribution of the light itself inside the green house, reducing the danger of the radiation directed at the plants and operators without however limiting its intensity, with positive effects on the greenhouse environment.

In addition, the presence of micronized quartzite significantly increases the barrier effect to the medium-Long IR radiation (Greenhouse effect) of the laminar layer (and therefore of the laminar body) with beneficial effects for greenhouse use. The laminar body used as a greenhouse roof has a very high retention of the heat rereleased by the earth and the plants during the night, permitting an improved agronomic result and an improved catalytic activity of the laminar body. Such latter in fact remains at higher temperatures: this favours the reactions of photo-catalysis.

The presence of the micronized quartzite and the nano-particles of TiO2 determine a significant barrier effect against the heating effect of the radiation entering the greenhouse. The quartzite and the titanium dioxide in fact absorb the radiation to perform the photo-catalytic functions (both exothermic and endothermic). It has thus been found that thanks to such heat barrier effect the temperature inside a greenhouse with a roof made with the laminar body according to the present invention always remains very low compared to greenhouses with traditional roofs. The laminar body according to the present invention in addition maintains its total transmittance substantially unaltered over time without the need to use other types of additives or chemical substances, suitable for creating a barrier to the light and therefore to the heat with negative consequences on the cultivation and on the life of the laminar body itself.

The laminar body according to the invention, when used as a roof for greenhouses, therefore explicates both a heat and water barrier effect.

According to a preferred embodiment solution, the aforesaid at least one laminar layer with nano-particles is in the form of film.

"Film" is taken to mean a laminar structure, generally flexible, having a main surface extension and thickness to the order of several tens of microns up to several hundred micron.

According to an alternative embodiment solution, the aforesaid at least one laminar layer with nano-particles may be in sheet form.

"Sheet" is taken to mean a rigid or semi-rigid laminar structure having a main surface extension and thickness to the order of several millimeters.

Advantageously, the laminar body according to the invention may be composed of a single laminar layer, in film or sheet form. In this case, the laminar layer defines both the two main opposite surfaces of the laminar body. In conditions of use, such surfaces should face one the inside and the other the outside of the greenhouse.

The laminar body according to the invention may comprise two or more laminar layers, preferably in film form. In this case, preferably, each laminar layer defines one of the two main opposite surfaces of the laminar body, which in conditions of use, should face one the inside and the other the outside of the greenhouse.

The laminar body may comprise at least one support substrate to which the single laminar layer is joined, or the aforesaid two or more laminar layers are joined. In the case of a single layer on the substrate, the single laminar layer defines only one of the two main surfaces of the laminar body.

In the case of two laminar layers joined to the substrate, the substrate is preferably interposed between the two laminar layers, so that the latter define the two main opposite surfaces of the laminar body, of which one will face the inside and the other the outside of the greenhouse.

The support substrate may be composed of a film in polymer material or of a sheet in polymer material.

Advantageously, the polymer material of the support substrate may be the same as that used for the polymer matrix of the single laminar layer or plurality of laminar layers.

According to a preferred embodiment solution, the laminar body comprises two laminar layers in film form with nano-particles and an intermediate support substrate in film form, positioned between the two layers.

Advantageously, the two laminar layers and the support substrate are co-extruded.

According to a particular embodiment solution, the two laminar layers with nano-particles have a polymer matrix composed of 15 to 20% in weight of random copolymer PP and 80 to 85% in weight of ethyl vinyl acetate (EVA), while the support substrate has a polymer matrix of EVA. EVA is used with 14% of vinyl acetate. On each of the two laminar layers 60 to 80 ppm in weight of titanium dioxide in the form of anatase is present. The nano-particles have dimensions of 5 to 10 nm (nanometers). Overall the laminar body has a thickness of approximately 200 μm, with a substantially uniform subdivision of the thickness of the laminar layers and the substrate.

According to a preferred embodiment solution, the two superficial laminar layers with nano-particles have a polymer matrix of polyethylene comprising ethyl vinyl acetate (EVA) with a concentration in weight of between 20% and 15% (with 14% of vinyl acetate), while the intermediate substrate has a polymer matrix of polyethylene comprising ethyl vinyl acetate (EVA) with a concentration in weight of between 80% and 85% (with 14% of vinyl acetate). On each of the two laminar layers about 1,000 ppm in weight of titanium dioxide in the form of anatase nano-particles is present. The nano-particles have dimensions of 5 to 10 nm (nanometers).

Preferably, in the case of a laminar body comprising at least two superficial laminar layers with an intermediate substrate interposed between them, one of the two superficial laminar layers has a polymer matrix comprising the aforementioned surfactant additives, while the other superficial laminar layer has a polymer matrix which does not contain surfactant additives. For reasons which will be described henceforth, when the laminar body is used as a roof of a greenhouse, the superficial laminar layer with the surfactant additives should be made to face the inside of the greenhouse, while the other laminar layer without the aforementioned surfactants additives should be made to face the outside of the greenhouse.

The intermediate substrate may have the same composition as the superficial laminar layers. In particular, the intermediate substrate may have a polymer matrix and nano-particles of titanium dioxide TiO2 in the anatase and/or rutilium form, dispersed in the polymer matrix. The nano-particles have dimensions of not more than 100 nm, preferably not more than 20 nm, and even more preferably not more than 10 nm. The titanium dioxide is present in a concentration in weight of between 30 and 1500 ppm in relation to the polymer matrix, and preferably in a concentration of 300 to 1500 ppm. More in detail, the polymer matrix of the intermediate substrate may comprise within it the same additives, as regards type and concentration, as those contained in the two superficial laminar layers and already defined above.

Alternatively, the intermediate substrate may have a different composition to the superficial laminar layers. In particular, the intermediate substrate may not contain nano-particles of titanium dioxide or may have a much lower concentration. What has been said of the nano particles also applies to the micronized quartzite, photo-stabilizers and UV filters.

Preferably, the intermediate substrate always comprises within it surfactant additives, chosen from the group composed of ethyl-ester octadecane and sorbitan monostearate, taken singly or mixed with each other. Such surfactant additives are present with a concentration in weight similar to (i.e. from 1% to 1.5%), or even higher than that of the superficial laminar layers. Such additives have low melting points (below 50° C.) and therefore have a tendency to migrate towards the outside of the laminar body and then to abandon it. The intermediate substrate may act as a reserve tank or reservoir for the superficial laminar layers, ensuring a stable concentration of such additives in the superficial laminar layers for a more prolonged period of time. The additives in fact migrate progressively towards the laminar layers also on account of the concentration gradients.

The composition of the intermediate substrate is chosen in relation to the thickness of the superficial laminar layers. As the thickness diminishes, the contribution—in terms of the beneficial effects described according to the invention—provided by the superficial laminar layers diminishes. The contribution of the intermediate substrate therefore also becomes necessary. Consequently, in the case of superficial laminar layers of reduced thickness (20-30 μm), the substrate has a composition, in quality and concentration of the additives and of the nano-particles, equivalent to that of the superficial laminar layers.

Preferably, the laminar body according to the invention, in its various configurations, has thicknesses of 25 to 300 μm. Thicknesses close to the lower limit are preferably adopted for solutions with a single laminar layer, while thicknesses close to the upper limit are preferably adopted for multilayer solutions.

Solutions may also be envisaged with thicknesses outside the aforementioned range.

Preferably, the dimensions of the nano-particles of titanium dioxide are chosen in relation to the thicknesses of the laminar body and of the single laminar layers. In particular it is absolutely preferable to use nano-particles of dimensions not greater than 10 μm when the thicknesses of the laminar body are close to the lower limit of the aforementioned range.

The laminar layers and the substrate in film form are preferably made by extrusion. In particular, extrusion by blowing, extrusion by calendering or flat sheet extrusion may be used. In the case of multilayer laminar bodies, i.e. with two or more laminar layers, with or without support substrate in the form of film, it is preferable to use a co-extrusion process.

In the case of a substrate in sheet form, the single laminar layer or the two or more laminar layers are made separately and then made to adhere to the substrate.

Solutions with a laminar layer in sheet form may envisage in particular solid sheets and/or sheets with an alveolar structure.

It has been observed that the laminar body according to the invention, used to make greenhouse roofs, makes it possible to achieve surprising agronomic results, if compared to traditional solutions, referable to a significant increase in the photosynthetic activity of the crops.

In particular, tests conducted in greenhouses used as nurseries show significantly earlier development compared to the normal rate of maturing of the plants grown. The plants have also been seen to be healthier in terms of perfection of the produce, with a high level of uniformity of the characteristics of the plants grown. A high degree of robustness of the plantlets and increase in leaf thickness was also observed. The plantlets moreover showed a perfect root apparatus, an important aspect for successful cultivation.

Tests were also conducted in greenhouses with very poor conditions of light and humidity. In greenhouses with roofs made with laminar bodies according to the invention (especially flexible films) the crops continued to produce without particular stress. In traditional greenhouses, in similar environmental conditions, a complete block of production was observed rather, despite treatment with pesticides, which had not been found necessary in the greenhouses according to the invention.

As will be specified further on in the description, in relation to the greenhouse cultivation method which the present invention relates to, the agronomic effects described above are connected to the presence of a laminar layer in the laminar body which defines at least one main surface of the laminar body itself and comprises a polymer matrix with nano-particles of titanium dioxide $TiO_2$ in the anatase and/or rutilium form, dispersed within it, with concentrations in weight ranging from 30 to 1500 ppm and particle dimensions of not more than 100 nm.

The best agronomic effects were found with laminar bodies having nano-particles of anatase, with concentrations in weight of around 1,000 ppm and particle dimensions of not more than 10 nm.

Such effects may be attributed mainly to the consequences of the photo catalytic activities generated by the nano-particles of titanium dioxide, in the anatase and/or rutilium form, in the presence of solar radiation at and/or next to the aforesaid laminar layer. The activating agent is the solar radiation (or even artificial light).

The aforesaid photo-catalytic activity causes degradation processes of a redox nature of the organic and/or inorganic substances deposited on the surface of the laminar layer and/or present near it. In fact, high concentrations of bacteria, viruses, pollutant and toxic substances (such as pesticides, in particular sulphur or chlorine based), which negatively influence the vegetative capacity and thereby the photosynthetic activity of the crops are often found inside the greenhouses, near the roofs or deposited on them.

The degradation products of the organic and inorganic pollutant substances no longer constitute a damage for the greenhouse environment, being ultimately $CO_2$ and water and/or soluble salts such as carbonates and nitrates which deposit on the surfaces where the reactions described above have taken place. Such salts are easy to remove: they can be eliminated by the irrigation water easily and without consequences on the environment, or even used directly by the plants.

The formation of $CO_2$ and water, and therefore the addition of such substances to the greenhouse environment, determines moreover a further passive increase of photosynthesis.

The aforesaid redox phenomena do not degrade the nano-particles of titanium dioxide given that it intervenes indirectly as a catalyser and not directly in the chemical transformation processes.

From a dynamic point of view of the process, it starts at the moment in which the luminous radiation, of a determined wavelength, involves the nano-particles of titanium dioxide which act as semi-conductors. Electron-hole couples are thereby created. These latter cause the oxidation and reduction of chemical species adsorbed on the support surface (in particular oxygen and water) and of appropriate redox potential. The chemical process which lies behind it is, in fact, an oxidation which starts thanks to the combined effect of the light (solar or artificial) and the air (oxygen) and/or water. The solar radiation (ultraviolet light and rays) activates the TiO2 contained in the polymer matrix laminar layer. The titanium interacts with the oxygen and with the water present in the environment inside the greenhouse. The chemical species generated by the redox processes of the oxygen and/or of the water oxidise or reduce the pollutant substances coming into contact with the surfaces, breaking them down.

The aforesaid degradation phenomena also determine self-cleaning processes of the surfaces. A perfect luminous transmittance of the laminar body is thereby maintained over time. The organic and/or inorganic substances deposited by photo catalysis once transformed into simple substances can be easily washed away by the rain. This entails a production increase compared to other films which naturally tend to become progressively dirty, diminishing the transmittance of the film, sometimes below the minimum threshold required for photosynthetic activity.

These degradation phenomena have positive effects on the life of the laminar body. In fact by favouring the degradation of sulphur and/or chlorine compounds (deriving especially from pesticides), they reduce the chemical aggressiveness of such compounds towards the laminar body.

The presence of titanium dioxide on the surface of the laminar body facing the inside of the greenhouse further creates conditions of hyperhydrophilia on the inner surfaces of the roof. This triggers a useful natural drip prevention process with a drastic reduction of the dangerous and injurious drops of condensation which form in traditional roof films, without recurring to use of surfactants. As already said, the combined use with surfactants is however preferable for attenuating the hyperhydrophilia properties of the titanium dioxide.

The solar rays, passing through the laminar layer with nano-particles of titanium dioxide are physically excited, as a result increasing the photosynthetic activity of the plants cultivated.

At the same time, the greenhouse effect characteristics of the laminar body are maintained and often increased. The increase in the greenhouse effect is linked to the opacity of the $TiO_2$ to Medium-Long infrared radiation (7,000-13,000 nm), that is the heat rereleased by the heated bodies which adds to the greenhouse effect peculiar to the laminar body itself.

The presence of nano-particles of TiO2, in particular in the anatase form, at the concentrations specified above, has the surprising characteristic of "interacting" with the UVA radiation, partially de-activating the effects of such radiation, formerly responsible, on account of their high wave frequency (see microwave effect), for the destruction of the polymer bonds and "scorching" of the plants. A non-filtering screening effect is thereby produced (different from the solutions of the prior art), which makes it possible to use without jeopardy the entire range of luminous radiations inside the greenhouse to the benefit of the crops and therefore economic-production management. The presence of nano-particles of TiO2 dispersed in the polymer matrix (at the concentrations specified) also has a "diffusive" effect which makes it possible to improve the distribution of the light inside the greenhouse with consequent increase in the uniformity of the produce.

Thanks to its ability to attenuate the reactivity of the UVA rays the presence of the titanium dioxide also has beneficial effects on the chemical stability and therefore on the mechanical resistance of the laminar body. This may lead to a significant reduction of greenhouse management costs and consequent reduction of the probability of damage to the crops due to precocious rupture of the roof material.

The present invention relates to a method of greenhouse cultivation.

Such method comprises the following steps:

a) predisposing a greenhouse making the roof with at least one laminar body according to the invention, as described above; in particular the laminar body comprises at least one laminar layer, which defines at least one main surface of the laminar body and comprises a polymer matrix with nano-particles of titanium dioxide TiO2 in the anatase and/or rutilium form, dispersed within it, the nano-particles having dimensions not greater than 100 nm and the titanium dioxide being present with a concentration in weight of between 30 and 1500 ppm in relation to the polymer matrix;

b) orienting the laminar body in such a way that the main surface defined by the laminar layer with nano-particles is facing directly inside the greenhouse; and c) encouraging the passage of solar radiation (visible and UV light) through the laminar layer with nano-particles of titanium dioxide, so as to encourage the redox reactions mentioned above of the oxygen and/or water present next to the laminar layer or adsorbed in it; such reactions being photo catalysed by the nano-particles of titanium dioxide and affecting the organic and inorganic substances coming into contact with or flowing close to the laminar layer, so as to degrade such substances.

In particular, step c) of encouraging the passage of solar radiation may take the form—during the step of making the laminar body—of eliminating or in any case reducing the use of substances or additives which screen the solar radiation, and in particular the UV and the visible light at higher frequency inasmuch as more intensely involved in the photocatalysis process. In particular, as already said, it is preferable to adopt non-screening photo-stabilising additives such as HALS or NOR-HALS.

Operatively, during cultivation such step c) may even take the practical form of avoiding the application of screening coatings on the outside of the greenhouses, such as slaked lime solutions (frequently used in greenhouse cultivation).

In its most general form, the invention envisages that at least one of the two main surfaces of the laminar body is defined by a laminar layer with nano-particles of titanium dioxide. In conditions of use, as pointed out in step b) of orientation of the cultivation method, it is fundamental for such main surface to face inside the greenhouse for its main positive agronomic effects spoken of earlier to be produced.

In a particularly advantageous form of the invention, the laminar body comprises at least one second laminar layer with nano-particles of titanium dioxide, which defines a second main surface of the laminar body, opposite the first. Such second surface is therefore facing the outside of the greenhouse and makes it possible to exploit the aforementioned self-cleaning process.

Advantageously, the cultivation method according to the invention provides that in the step b) of orientation the laminar body is positioned with the aforesaid second surface facing directly to the outside of the greenhouse. The passage of the solar radiation determines the aforesaid redox reactions on or near the surface of the laminar body facing towards the outside of the greenhouse, so as to degrade organic and inorganic substances present near or on such surface and thereby maintain the luminous transmittance of the laminar body high.

Preferably, the superficial laminar layer directly facing the inside of the greenhouse has a polymer matrix comprising the aforementioned surfactant additives, while the superficial laminar layer directly facing the outside of the greenhouse has a polymer matrix which does not contain surfactant additives, The invention also relates to the use of the laminar body according to the invention for making greenhouse roofs according to the purposes and ways of application of the laminar body (understood, for example, as the orientation of the laminar layers in relation to the inside of the greenhouse) already described.

The present invention relates to a masterbatch, in particular for making a laminar layer of a laminar body as described above, characterised by the fact of comprising a polymer base and nano-particles of titanium dioxide TiO2 in the anatase and/or rutilium form, dispersed in the polymer base, said nano-particles having dimensions not greater than 100 nm.

In particular, the nano-particles have dimensions not greater than 20 nm, and even more preferably not more than 10 nm.

Preferably, the titanium dioxide TiO2 has a purity of not less than 99.5%. Preferably, the titanium dioxide is free of contaminant elements which could have negative effects on the polymer matrix.

In particular, the polymer matrix comprises one or more polymers chosen from the group consisting of polyethylene, linear low density polyethylene (LLDPE), polypropylene, random copolymer polypropylene, ethylene vinyl acetate, ethylene butyl acrylate, ethylene methyl acrylate, poly methyl methacrylate, polycarbonate, polyamide, ethylene tetra fluoroethylene and polyvinylidene fluoride, taken singly or mixed with each other.

Advantageously, the masterbatch according to the invention is in the form of pellets.

Lastly, the present invention relates to a greenhouse characterised by the fact of having a roof comprising at least one laminar body according to the invention as described above. The laminar body is oriented in such a way that the main surface defined by the laminar layer with nano-particles faces directly inside the greenhouse.

The invention thereby permits numerous advantages in part already described to be achieved.

The invention makes it possible to increase the photosynthetic activity of the crops without reducing the screening effect. The screening effect, understood in particular in terms of attenuation of the direct transmission of solar radiation, is in fact ensured by the ability of the nano-particles of titanium dioxide (in particular in the anatase form) to attenuate the reactivity of the UVA radiation, at the same time determining a sort of "diffusion" and perfect distribution of the light inside the greenhouse with a relative uniformity of irradiation.

The increase in photo synthetic activity is linked directly to the physical excitation of the solar radiation which passes through the single laminar layer or plurality of laminar layers with nano-particles, as well as to the increase in the greenhouse effect phenomenon caused by the opacity of the titanium dioxide to the Infrared Medium-Long radiations (7,000-13,000 nm).

The increase of photosynthetic activity is further linked indirectly to the enrichment of the W greenhouse environment with water and CO2, with a passive increase in photosynthesis. The bacterial and viral destruction of the environment around the crops caused by photo catalytic degradation phenomena indirectly favours vegetative activity with healthy produce, naturally eliminating dangerous parasites which would require the use of pesticides and/or destruction of the produce.

The laminar body according to the invention also makes it possible to reduce the formation of condensation inside the greenhouse without the large scale use of surfactants or even excluding them entirely.

The laminar body according to the invention is in addition mechanically and chemically resistant.

The laminar body for making greenhouse roofs is lastly, easy and economical to make.

The invention thus conceived therefore achieves the purposes set out.

Obviously in its practical embodiment it may assume forms and configurations different from the above while remaining within the present sphere of protection.

Moreover, all the parts may be replaced by technically equivalent parts and the dimensions, forms and materials may be varied as required.

The invention claimed is:

1. Laminar body for making greenhouse roofs, comprising at least one laminar layer, which defines at least one main surface of said laminar body and comprises a polymer matrix comprising i) one or more polyolefin or thermoplastic copolymers of polyolefins, ii) a photo-stabilizing additive; and iii) nano-particles of titanium dioxide ($TiO_2$) in the anatase and/or rutilium form dispersed therein, wherein said nano-particles having dimensions not greater than 100 nm, and wherein the titanium dioxide is present in a weight concentration from 30 to 1500 ppm in relation to the total weight of the polymer matrix.

2. Laminar body according to claim 1, wherein said nano-particles have dimensions of not more than 20 nm.

3. Laminar body according to claim 2, wherein said nano-particles have dimensions of not more than 10 nm.

4. Laminar body according to claim 1, wherein the titanium dioxide is present with a concentration in weight of 300 to 1500 ppm.

5. Laminar body according to claim 1, wherein the titanium dioxide ($TiO_2$) has a purity of not less than 99.5%.

6. Laminar body according to claim 1, wherein said at least one laminar layer is obtained by extrusion or co-extrusion.

7. Laminar body according to claim 1, wherein the polymer matrix comprises one or more polymers selected from the group consisting of polyethylene, linear low density polyethylene (LLDPE), polypropylene, copolymer propylene, ethylene vinyl acetate, ethylene butyl acrylate, ethylene methyl acrylate, polymethyl methacrylate, polycarbonate, polyamide, and copolymers of propylene, ethylene vinyl acetate, ethylene butyl acrylate, ethylene methyl acrylate, ethylene tetra fluoroethylene and polyvinylidene fluoride.

8. Laminar body according to claim 1, wherein the photo-stabilizing additive is chosen from sterically hindered amine stabilizers.

9. Laminar body according to claim 1, wherein the photo-stabilizing additive is present at a weight concentration of 0.60% to 1.25% based on the weight of the polymer matrix.

10. Laminar body according to claim 1, wherein the polymer matrix further comprises additives having a UV filter function.

11. Laminar body according to claim 10, wherein said additives having a UV filter function are present at a weight concentration of 0.15% to 0.35% based on the weight of the polymer matrix.

12. Laminar body according to claim 1, wherein the polymer matrix further comprises surfactant additives.

13. Laminar body according to claim 1, wherein the surfactant additives are chosen from ethyl-ester octadecane or sorbitan monostearate, taken singly or mixed with each other, said surfactant additives being present at a weight concentration of 1% to 1.5% based on the weight of the polymer matrix.

14. Laminar body according to claim 1, wherein the polymer matrix further comprises micronized quartzite.

15. Laminar body according to claim 1, wherein said micronized quartzite is present at a weight concentration of 0.3% to 0.5% based on the weight of the polymer matrix.

16. Laminar body according to claim 14, wherein said micronized quartzite has a mean particle dimension of 10 to 20 μm.

17. Laminar body according to claim 1, wherein said at least one laminar layer with nano-particles of $TiO_2$ is in film form.

18. Laminar body according to claim 1, further comprising at least one support substrate to which said at least one laminar layer with nano-particles of $TiO_2$ is associated, the support substrate being composed of a polymer film or of a polymer sheet.

19. Laminar body according to claim 18, comprising at least two laminar layers with nano-particles of $TiO_2$ in film form, each of which defines one of the two main opposite surfaces of the laminar body.

20. Laminar body according to claim 19, wherein said substrate is positioned between said two laminar layers in film form.

21. Laminar body according to claim 20, wherein said two laminar layers and said substrate are co-extruded.

22. Laminar body according to 1, wherein:
said laminar body comprises at least two laminar layers with nano-particles of $TiO_2$ in film form, each of which defines one of the two main opposite surfaces of the laminar body;
the polymer matrix further comprises surfactant additives;
said laminar body comprises at least one support substrate to which said two laminar layers with nano-particles of $TiO_2$ are associated, the support substrate being composed of a polymer film or of a polymer sheet,
said substrate being positioned between said two laminar layers in film form; and
one of the two laminar layers comprises a polymer matrix comprising said surfactant additives, while the other laminar layer comprises a polymer matrix which does not contain surfactant additives.

23. Laminar body according to claim 1, wherein:
said laminar body comprises at least two laminar layers with nano-particles of $TiO_2$ in film form, each of which defines one of the two main opposite surfaces of the laminar body;
said laminar body comprises at least one support substrate to which said two laminar layers with nano-particles of $TiO_2$ are associated, the support substrate being composed of a polymer film or of a polymer sheet, said substrate being positioned between said two laminar layers in film form;
wherein said support substrate comprises a polymer matrix comprising one or more polyolefin or thermoplastic copolymers of polyolefins and nano-particles of titanium dioxide ($TiO_2$) in the anatase and/or rutilium form dispersed therein, said nano-particles having dimensions not greater than 100 nm, and wherein the titanium dioxide is present in a weight concentration from 30 to 1500 ppm in relation to the total weight of the polymer matrix.

24. Laminar body according to claim 23, wherein the polymer matrix of the support substrate is the same as the polymer matrix contained in the two laminar layers.

25. Laminar body according to claim 1, wherein:
said laminar body comprises at least two laminar layers with nano-particles of $TiO_2$ in film form, each of which defines one of the two main opposite surfaces of the laminar body;
said laminar body comprises at least one support substrate to which said two laminar layers with nano-particles of $TiO_2$ are associated, the support substrate being composed of a polymer film or of a polymer sheet, said substrate being positioned between said two laminar layers in film form;
wherein the polymer matrix of said support substrate further comprises surfactant additives chosen from ethyl-ester octadecane or sorbitan monostearate, taken singly or mixed with each other, said surfactant additives are present in a weight concentration from 1% to 1.5% in relation to the total weight of the polymer matrix.

26. Laminar body according to claim 1, wherein said at least one laminar layer with nano-particles of $TiO_2$ is in sheet form.

27. Method of greenhouse cultivation, comprising the following steps:
a) predisposing a greenhouse for cultivation by making the roof with at least one laminar body, comprising at least one laminar layer, which defines at least one main surface of the laminar body and comprises a polymer matrix comprising i) one or more polyolefin or thermoplastic copolymers of polyolefins, ii) a photo-stabilizing additive; and iii) nano-particles of titanium dioxide ($TiO_2$) in the anatase and/or rutilium form dispersed therein, the nano-particles of $TiO_2$ having dimensions not greater than 100 nm, and wherein the titanium dioxide is present at a weight concentration from 30 to 1500 ppm in relation to the total weight of the polymer matrix;
b) orienting the laminar body in such a way that the main surface defined by the laminar layer with nano-particles of $TiO_2$ is facing directly inside the greenhouse; and
c) allowing the passage of solar radiation through the laminar layer with nano-particles of titanium dioxide, so as to encourage redox reactions of the oxygen and/or water present next to the laminar layer or adsorbed in it, said reactions being photo catalyzed by the nano-particles of titanium dioxide and affecting the organic and inorganic substances coming into contact with or flowing close to the laminar layer, so as to degrade such substances.

28. Method according to claim 27, wherein said laminar body comprises at least one second laminar layer with nano-particles of titanium dioxide, said second laminar layer defining a second main surface of the laminar body, opposite the first, in said step b) the laminar body being positioned with such second surface facing directly onto the outside of the greenhouse, the passage of solar radiation determining said redox reactions on or near the surface of the laminar body facing towards the outside of the greenhouse, so as to degrade organic and inorganic substances present near or on such surface so as to maintain the high luminous transmittance of the laminar body.

29. Method according to claim 28, wherein the laminar layer directly facing the inside of the greenhouse comprises a polymer matrix comprising surfactant additives, and wherein the laminar layer directly facing the outside of the greenhouse comprises a polymer matrix which does not contain surfactant additives.

30. Greenhouse comprising a roof comprising at least one laminar body according to claim 1, wherein said laminar body is directed in such a way that the main surface defined by said at least one laminar layer with nano-particles of $TiO_2$ is directly facing inside the greenhouse.

31. Greenhouse according to claim 30, wherein said laminar body further comprises at least one second laminar layer comprising a polymer matrix comprising one or more polyolefin or thermoplastic copolymers of polyolefins and nano-particles of titanium dioxide dispersed therein, said second laminar layer defining a second main surface of the laminar body, opposite the first, wherein the laminar body is positioned with such second surface facing directly to the outside of the greenhouse, and wherein said first laminar layer comprises a polymer matrix comprising surfactant additives, while the second laminar layer directly facing the outside of the greenhouse comprises a polymer matrix which does not contain surfactant additives.

32. Masterbatch composition for making a laminar layer of a laminar body as defined by claim 1 for use in a greenhouse, wherein said nano-particles of ($TiO_2$) have dimensions not greater than 100 nm, and are present in the laminar layer in a final weight concentration from 30 ppm to 1500 ppm in relation to the total weight of the polymer matrix.

33. Masterbatch according to claim 32, wherein said nano-particles have dimensions of not more than 10 nm.

34. Masterbatch according to claim 32, wherein the polymer matrix comprises one or more polymers selected from the group consisting of polyethylene, linear low density polyethylene (LLDPE), polypropylene, copolymer propylene, ethylene vinyl acetate, ethylene butyl acrylate, ethylene methyl acrylate, polymethyl methacrylate, polycarbonate, polyamide, and copolymers of propylene, ethylene vinyl acetate, ethylene butyl acrylate, ethylene methyl acrylate, ethylene tetra fluoroethylene and polyvinylidene fluoride.

35. Masterbatch according to claim 32, in form of pellets.

36. Masterbatch according to claim 34, wherein the polymer matrix is polyethylene, LLDPE, and/or polypropylene.

37. Masterbatch according to claim 34, wherein the photo-stabilizing additive is chosen from sterically hindered amine light stabilizers such that its final weight concentration in the laminar layer is from 0.60% to 1.25% in relation to the polymer matrix.

38. Masterbatch according to claim 37, wherein the polymer matrix optionally further comprises at least one additive having a UV filter function such that when said at least one additive is present its final weight concentration in the laminar layer is from 0.15% to 0.35% in relation to the polymer matrix.

39. Masterbatch according to claim 38, wherein the polymer matrix optionally further comprises at least one surfactant additive chosen from ethyl-ester octadecane, sorbitan monostearate, or combinations thereof such that when said at least one surfactant additive is present its final weight concentration in the laminar layer is from 1.0% to 1.5% in relation to the polymer matrix.

40. Masterbatch according to claim 39, wherein the polymer matrix optionally further comprises micronized quartzite such that when said micronized quartzite is present it has a mean particle dimension of from 10 to 20 μm, and its final weight concentration in the laminar layer is from 0.3% to 0.5% in relation to the polymer matrix.

* * * * *